United States Patent [19]

Crow

[11] 3,982,392

[45] Sept. 28, 1976

[54] COMBUSTION APPARATUS

[75] Inventor: David E. Crow, Glastonbury, Conn.

[73] Assignee: General Motors Corporation, Detroit, Mich.

[22] Filed: Jan. 19, 1976

[21] Appl. No.: 650,242

Related U.S. Application Data

[63] Continuation of Ser. No. 502,277, Sept. 3, 1974, abandoned.

[52] U.S. Cl. .............................. 60/39.23; 60/39.65; 60/39.71; 239/402.5; 239/403; 239/427.3; 431/173

[51] Int. Cl.[2] ............................................ F02C 7/22

[58] Field of Search ..... 60/39.71, 39.74 R, 39.74 B, 60/39.65, 39.23; 239/400, 402.5, 403, 405, 406, 427, 427.3, 427.5; 431/173

[56] References Cited

UNITED STATES PATENTS

| | | | |
|---|---|---|---|
| 2,398,654 | 4/1946 | Lubbock et al. | 60/39.65 |
| 2,446,059 | 7/1948 | Peterson et al. | 60/39.23 |
| 2,458,066 | 1/1949 | Farkas | 60/39.65 |
| 3,851,466 | 12/1974 | Verdouw | 60/39.65 |
| 3,853,273 | 12/1974 | Bahr et al. | 60/39.74 R |
| 3,859,786 | 1/1975 | Azelborn et al. | 60/39.65 |

FOREIGN PATENTS OR APPLICATIONS

| | | | |
|---|---|---|---|
| 1,451,393 | 3/1969 | Germany | 239/400 |
| 398,488 | 7/1924 | Germany | 239/400 |
| 537,627 | 11/1931 | Germany | 239/406 |

OTHER PUBLICATIONS

Wade et al., "Low Emission Combustion for the Regenerative Gas Turbine," ASME Trans, Jan., 1974, pp. 34–39.

Shaw, H., "Reduction of Nitrogen Oxide Emissions from a Gas Turbine Combustor by Fuel Modifications," Gas Turb. Conf., Wash., D.C., Apr. 8–12, 1973; pp. 301–304.

*Primary Examiner*—Carlton R. Croyle
*Assistant Examiner*—Robert E. Garrett
*Attorney, Agent, or Firm*—Frederick M. Ritchie

[57] ABSTRACT

A combustion apparatus for gas turbine engines employs a combustion liner structure adapted to promote complete combustion of liquid hydrocarbon fuel and minimize undesired combustion products. Compressed primary air flows radially inward with swirl into a prechamber into which fuel is sprayed. Except during start-up, the air is heated. Normally, the air mixes with and evaporates the fuel and the mixture flows through a throat into a reaction chamber. The upstream end of the reaction chamber is bounded by a conical annular wall. The liner wall downstream of the throat defines the reaction zone to which additional primary air is fed and a dilution zone to which secondary air is admitted. The area of the primary air entrance is variable to maintain a lean fuel-air ratio in the reaction zone throughout the operating regime.

1 Claim, 2 Drawing Figures

COMBUSTION APPARATUS

This is a continuation of application Ser. No. 502,277, filed Sept, 3, 1974, abandoned.

This invention relates to combustion apparatuses such as are adapted for use in engines such as gas turbines. In such a combustion apparatus, combustion takes place in compressed air in a relatively small space at high temperature, and the resulting combustion products are then diluted to bring the temperature down to a level acceptable to the turbine.

The technology of such combustion apparatuses has been quite highly developed to a level in which such combustors generally are compact, operate with low pressure drop, provide good temperature distribution in the outlet, are tolerant of considerably varying fuel-to-air ratios, operate over a broad spectrum of pressures and inlet air temperatures, and are characterized by long life and reliability.

State-of-the art gas turbine combustors have had quite low output of pollutants such as carbon monoxide, incompletely burned hydrocarbons, and particulate matter such as smoke. However, the intense combustion in these devices tends to promote combination of atmospheric nitrogen and oxygen to form undesirable oxides of nitrogen. Generally, modifications of combustion apparatus to reduce output of oxides of nitrogen increase the other pollutants. For example, low temperature combustion and quick quenching of the flame both tend to reduce nitrogen oxides at the expense of less complete combustion of the fuel.

The present invention is directed towards an improved combustion apparatus, and more particularly a combustion liner structure adapted to promote cleaner combustion. It provides for evaporation of the fuel in the air prior to combustion, provides for burning with a lean mixture (thus reducing nitrogen oxide formation by lowering the maximum combustion temperature), and provides a combustion apparatus which may readily be ignited but which operates in a particularly clean mode during normal operation.

The structure which enables the preferred mode of combustion is characterized by a prechamber type of combustion liner with discharge from the prechamber through a convergentdivergent throat into a reaction chamber bounded by a forward wall of favorable divergence angel. It is characterized by an arrangement to vary the ratio of primary (combustion) air to secondary (dilution) air by varying the area of the entrance for primary air to suit the operating conditions of the combustion apparatus at any time; that is, for example, the rates of supply of air and fuel to the apparatus as these vary with engine power level and ambient conditions. It is further characterized by swirling the air in the prechamber to promote light-off and warm-up by recirculation of hot gases from the reaction chamber into the prechamber due to such swirl.

The principal objects of the invention are to provide a particularly clean combustion apparatus, to provide such an apparatus which is of simple structure and of dimensions suitable for incorporation into a practicable gas turbine engine, to provide for control of the relative proportions of primary and secondary air; and to minimize pressure drops as far as feasible while maintaining clean combustion.

The nature of the invention and its advantages will be apparent to those skilled in the art from the succeeding detailed description of the method of combustion and of the preferred apparatus with which the method may be practiced, taken in connection with the accompanying drawings.

Figure 1:
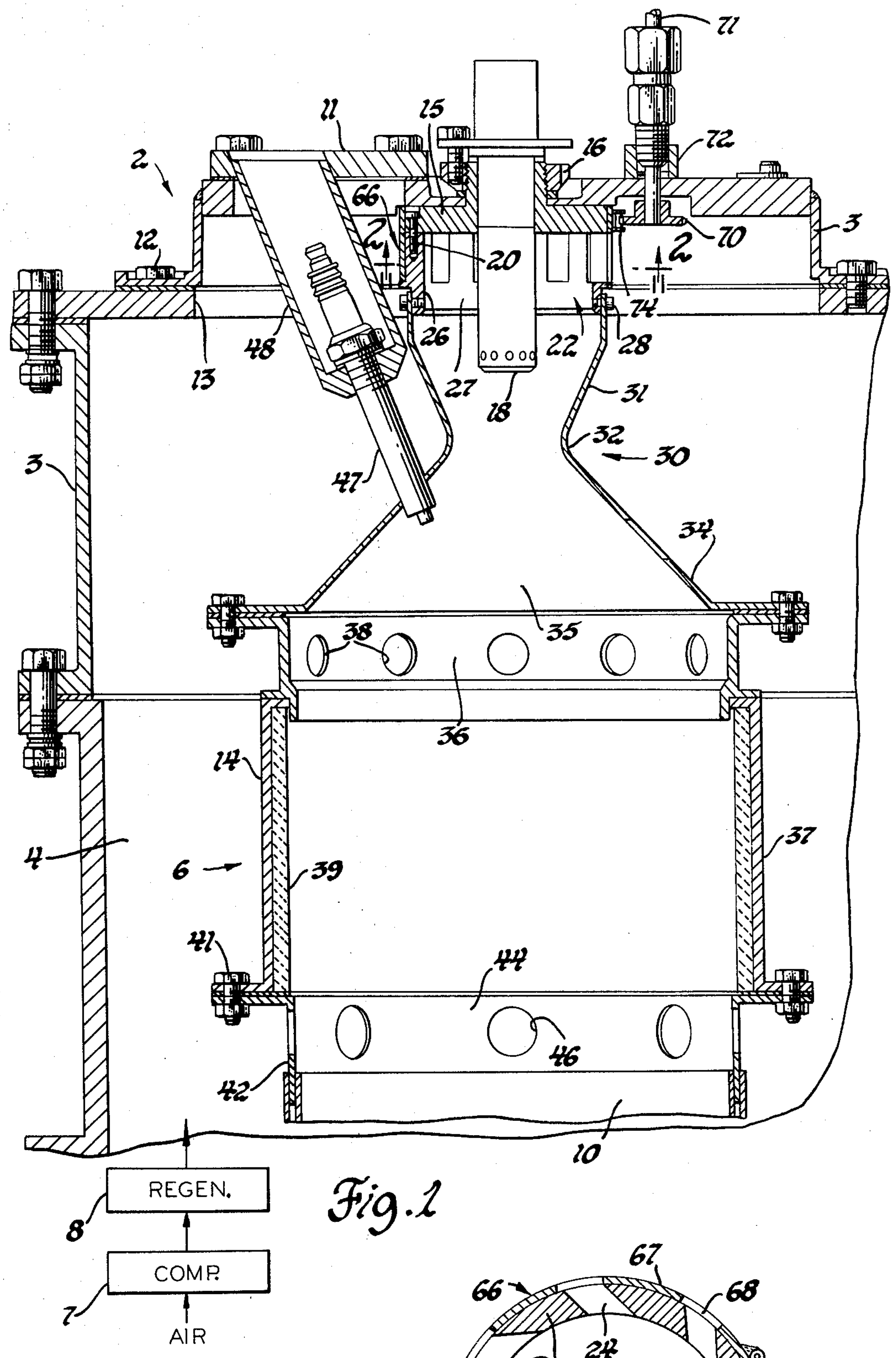
FIG. 1 is a drawing of a combustion apparatus showing the combustion liner in a sectional view taken in a plane containing the axis of the liner, the figure also illustrating schematically means for supplying hot compressed air to the combustion apparatus.

Referring first to FIG. 1, the combustion apparatus 2 illustrated in a test installation of a combustor for a small gas turbine engine for propulsion of automobiles. Since the invention can be understood without reference to details of an engine, these are omitted. The engine in which the combustion apparatus is used is preferably a regenerative engine; that is, one in which the compressed air flowing to the combustion apparatus is heated by heat exchange with gases exhausting from the turbine of the engine. The problems of nitrogen oxide formation are more formidable in a regenerative engine than in a nonregenerative engine because of the much higher temperature of the air entering the combustion apparatus. Also, a regenerative engine is more favorable to the described method of combustion, since it involves vaporization of the fuel prior to combustion, which may most readily be accomplished with relatively hot air entering the combustor. To be more specific, it is desirable that the combustion air be at least as warm as 400°F. This is much below the usual temperature in a regenerative engine which may be of the order of 900°F. or more during the normal engine operating regime.

The combustion apparatus may be employed in an engine such as that described in Collman et al U.S. Pat. No. 3,077,074, Feb. 12, 1963 or Collman et al U.S. Pat. No. 3,267,674, Aug. 23, 1966. Such an engine may include an engine casing or housing corresponding to the housing shown fragmentarily at 3, which defines a plenum chamber 4 surrounding a combustion liner 6. The air for combustion is supplied to the plenum chamber 4 from the atmosphere through a compressor 7, which may operate at a pressure ratio of about 3 to 6 in such engines, through a regenerative or recuperative heat exchanger 8. As will be further described, the air flows from the plenum chamber into the combustion liner 6 where fuel is burned in it and the resulting mixture of air and combustion products are delivered through a transition conduit 10 to a turbine (not illustrated) which drives the compressor. The turbine may drive an external load, or a second turbine may do so.

The enclosure for the combustion apparatus includes, in part, a removable cover plate 11 which is secured by bolts 12 over an opening 13 in the housing or casing 3. The combustion liner 6 is fixed at its upstream end to the cover plate 11 and is telescoped at its downstream end into the transition conduit 10, thus being supported at both ends with freedom for expansion. The housing 3 as such as immaterial to the invention which lies in the structure of liner 6.

The liner 6 illustrated is of circular cross section, which is preferred although not mandatory. The liner thus is defined by wall means 14 of circular cross section and an upstream end plate 15. End plate 15 is fixed to the cover plate 11 by a nut 16. A fuel spray nozzle 18, which is preferably of an air-assisted spray type, extends through the center of the annular end plate 15. This nozzle is supplied with liquid hydrocarbon fuel.

Figure 2:
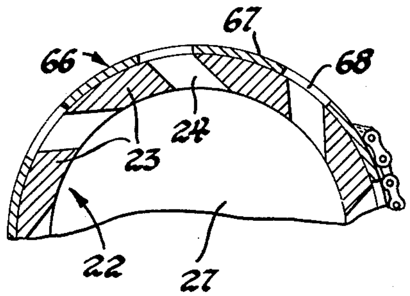
FIG. 2 is a cross-sectional view of the primary air entrance structure taken on the plane indicated by the line 2—2 in FIG. 1.

End plate 15 is fixed by machine screws 20 to a squirrel-cage-like primary air entrance structure 22 (see also FIG. 2). This structure comprises eight or more parallel contoured bars 23 defining between them axially and radially extending entrance slots 24 for primary air; that is, air in which the fuel is burned. The bars 23 and slots 24 may be formed by milling the slots through a generally cylindrical structure. Structure 22 includes a rearwardly extending flange 26 for connection to the downstream portions of the liner. The air entrance structure 22 defines the major portion of the outer wall of a prechamber 27.

Flange 26 is fixed by a ring of machine screws 28 to the upstream end of a convergent-divergent liner portion 30. This portion comprises a converging wall portion 31, a streamlined throat 32, and a downstream diverging portion 34. The converging and diverging portions of the throat provide a smooth transition as indicated on FIG. 1. The prechamber terminates at the throat 32; the wall 31 thus constitutes a portion of the prechamber wall. A reaction chamber 35 in which combustion normally takes place extends downstream from the throat 32. The upstream end of the reaction chamber 35 is defined by the diverging or conical wall 34. The conical wall portion 34 diverges at an angle of about 33° to the axis of the liner. It extends from the throat to the outermost diameter of the combustion liner. While the angle of divergence may be varied to some extent, that specified has been found satisfactory.

A reaction chamber outer wall extends downstream from the conical forward wall 34. This comprises a first section 36 which may be integral with or bolted to the forward wall 34 and an intermediate portion 37. The first section 36, which is at about the downstream end of the reaction chamber, has 12 primary air holes 38 to admit additional combustion air radially into the liner.

Intermediate section 37 is shown as having an inner liner 39 which is cylinder of ceramic material to insulate the metallic wall 37 to some extent from the hot gases.

Liner 39 is retained by the upstream end of a further portion 42 of the liner fixed by bolts 41 to wall portion 37.

The farthest downstream portion 42 of liner 6 defines a dilution zone 44 through which the combustion products flow to the transition conduit 10. The dilution zone provides for entry, and mixture with the combustion products, of additional heated compressed air from the plenum chamber 4. The secondary or dilution air may enter through a ring of eight rather large ports 46. It should be understood that the fuel should be completely burned by the time the combustion products flowing through the liner reach the dilution ports 46 and that this secondary air does not enter into the combustion to any observable extent. All of the combustion air is supplied through the primary air entrances 22 and 38.

Combustion is initiated by an electric spark type igniter 47 which may be of conventional structure mounted in a socket 48 in the cover plate 11.

The primary air entrance structure 22, in addition to the cylindrical body with more or less tangential inlet slots 24 already described, comprises a sleeve 66 rotatable on the exterior of the cylindrical structure 22 to vary air flow. The rotatable sleeve 66 defines parallel bars 67 separated by ports 68 which may register variably with the slots 24. Sleeve 66 is located axially between a radially extending flange on body 22 downstream of the entrance slots 24 and the cover plate 11. A sprocket 70 fixed to a shaft 71 which extends through a gland 72 mounted on the cover 11 meshes with a length of link chain 74 welded to the outer surface of the sleeve 66. By rotation of shaft 71 by any suitable control or, for that matter, manually, the area of entrance 22 and therefore the relative areas and relative flows at the primary and secondary air entrances may be varied over a considerable range.

Now that the structure has been described, we may consider the mode of operation of the combustion apparatus. The heated compressed air entering through the swirler 22 generates a vortex flow field in the prechamber 27. The fuel nozzle produces fuel droplets in the 100 micron range. These droplets are further atomized by viscous shear stresses produced by the vortex flow field in the prechamber. At the same time, heat transfer from the compressed air heated by regeneration to the fuel droplets promotes vaporization of the fuel. It may be that some droplets impinge on the wall of the prechamber where final vaporization will occur.

Varying the area of the air entrance 22 influences the amount of atomization and vaporization that occurs in the prechamber as well as the equivalence ratio (ratio of fuel to air) of the charge entering the reaction zone of the liner through the throat 32.

The fuel-air mixture passing through the throat tends to follow the outer wall of the throat 32 and the forward wall 34 of the reaction zone because of the swirl. The flame is prevented from propagating upstream from the combustion section into the prechamber by the relatively high velocity which occurs in the throat area separating the prechamber and the reaction chamber. The atomization, vaporization, and mixing of the fuel with the air takes place in the absence of combustion.

The combustion occurs in the conical divergent section immediately downstream of throat 32. The decay of the vortex flow field and the divergence of this conical section induce a stable recirculation pattern in this region. The flowing gases tend to flow inward toward the liner axis and forward toward the throat, and then recirculate near the wall 34. The recirculation pattern is further energized by the energy of the primary air jets entering radially and generally tangent to the downstream portion of the recirculation pattern through the holes 38.

It is considered that oxidation of the hydrocarbons is completed in the diverging section, the additional length between the primary air entrances 38 and the secondary air entrances 46 being required for oxidation of carbon monoxide only.

Test results from the combustion apparatus illustrated have shown very favorable low levels of production of carbon monoxide and nitrogen oxides. These results are believed to be due primarily to the employment of a fuel-lean, homogeneous combustion concept. The more important features of the combustion apparatus are considered to be the prechamber separated from the reaction chamber permitting the vaporization of fuel and mixture with air prior to combustion, the variable geometry swirler to control the reaction zone fuel-air ratio, and the divergent reaction section to enhance combustion stability.

A note as to dimensions of the particular combustor may be helpful. This is intended for an engine of 3 lbs.

per second air flow, 4 to 1 pressure ratio. and 225 horsepower. The length and maximum diameter of the liner are approximately 13 inches and 6.5 inches, respectively. Experiments with different configurations of the convergent-divergent sections 31, 32, 34 have indicated that high divergence angle of wall 34 and increasing throat diameter increase the tendency for the flame to flash back into the prechamber, particulary at low air flows. The best configuration tested had a throat diameter of 1.59 inches, a divergence angle of 33° for wall 34, and a cone length to throat diameter ratio of 2.13. This liner had a primary swirler of approximately 2 square inches flow area, six ⅝ inch diameter holes 38, and five 1 inch diameter holes 46.

Experience with the combustion apparatus has indicated a quite substantial reduction in nitrogen oxide emissions over prior art combustion liners of approximately the same over-all dimensions which lack the convergent-divergent wall structure embodying the convergent section 31, throat 32, and divergent section 34 as described. Such prior art devices, in general, are characterized by a nonconvergent or only slightly convergent outlet from the prechamber and by an abrupt or nearly perpendicular divergence from the prechamber outlet to the reaction chamber.

It should be apparent to those skilled in the art that the combustion structure illustrated and described above is highly desirable as a means for maintaining reliable combustion and reducing the production of undesired oxides of nitrogen.

The detailed description of the preferred embodiment of the invention for the purpose of explaining the principles thereof is not to be considered as limiting or restricting the invention, since many modifications may be made by the exercise of skill in the art.

I claim:

1. In combustion apparatus for a gas turbine engine comprising, in combination, means defining a housing adapted to receive a flow of hot compressed air, a combustion liner in the housing comprising liner wall means extending from the upstream end of the liner to the downstream end thereof, said liner wall means including prechamber wall means having a converging wall portion and a downstream streamlined imperforate throat section both defining a noncombustion fuel prevaporization chamber, said throat section defining an outlet from the prevaporization chamber, said liner wall means including a diverging cone connected to said throat section to define a combustion reaction chamber downstream of said throat section, a fuel spray nozzle supported on said liner wall means including a tip portion thereon located concentrically within said prevaporization chamber and spaced axially upstream of said imperforate throat section and operative to direct a fuel spray into said prevaporization chamber, said prechamber wall means including a primary air swirler for admitting hot compressed air from the housing into said prevaporization chamber, said swirler being variable in effective area to vary the primary air flow swirl into said prevaporization chamber to control the degree of mixing between said fuel spray and said primary air as well as the air fuel ratio thereof, said imperforate throat section providing a smooth flow path for mixed air and fuel from the noncombustion prevaporization chamber across the inner wall of said downstream diverging cone for maintaining a flame front on the inner surface of said diverging cone downstream of said throat section, said liner wall means including a row of primary air ports immediately adjacent to and downstream of the diverging cone at the downstream end of the combustion reaction chamber for admitting additional primary combustion air radially into the combustion reaction zone, said diverging cone diverging from the longitudinal axis of said liner wall means at an angle of about 33° and said cone having a length with respect to the diameter of said throat section to produce a ratio of cone length to throat diameter in the range of 2.0 through 2.2 for maintaining a flow of noncombusted prevaporized and mixed fuel and air from the prevaporization chamber into said combustion reaction chamber and to maintain the flame front on the inner wall of said diverging cone downstream and exteriorly of said prevaporization chamber, said combustion reaction chamber having an outlet diameter about four times that of said throat to prevent undesirable entrance of the flame front from said reaction chamber into said noncombustion prevaporization chamber.

* * * * *